United States Patent
Kliewe

(10) Patent No.: US 8,364,714 B2
(45) Date of Patent: Jan. 29, 2013

(54) SERVICING QUERY WITH ACCESS PATH SECURITY IN RELATIONAL DATABASE MANAGEMENT SYSTEM

(75) Inventor: John Kliewe, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/480,057

(22) Filed: Jun. 8, 2009

(65) Prior Publication Data

US 2010/0312785 A1 Dec. 9, 2010

(51) Int. Cl.
*G06F 17/30* (2006.01)
(52) U.S. Cl. ........................ 707/784; 707/716
(58) Field of Classification Search ................ 707/716, 707/781, 783, 784
See application file for complete search history.

(56) References Cited

U.S. PATENT DOCUMENTS

| | | | |
|---|---|---|---|
| 6,560,596 | B1 | 5/2003 | Margulies et al. |
| 6,951,013 | B1 * | 9/2005 | Lozins .......................... 717/125 |
| 7,096,235 | B2 | 8/2006 | McCool et al. |
| 7,398,265 | B2 | 7/2008 | Thusoo et al. |
| 2008/0082540 | A1 * | 4/2008 | Weissman et al. ................. 707/9 |

OTHER PUBLICATIONS

Extending SQL's grant operation to limit privileges, A Rosenthal, E Sciore—Data and Application Security, 2002—Springer.*
Configuring role-based access control to enforce mandatory and discretionary access control policies S Osborn, R Sandhu, Q Munawer—ACM Transactions on Information and System Security, 2000—dl.acm.org.*
Koloniari et al. Peer-to-Peer Management of XML Data: Issues and Research Challenges. SIGMOD Record, vol. 34, No. 2, Jun. 2005. pp. 6-17.
Zhou et al. Buffering Accesses to Memory-Resident Index Structures. Proceedings of the 29th VLDB Conference, Berlin, Germany, 2003. 12 pages.

* cited by examiner

*Primary Examiner* — Tony Mahmoudi
*Assistant Examiner* — Nan Hutton
(74) *Attorney, Agent, or Firm* — Schmeiser, Olsen & Watts; Anna Linne

(57) ABSTRACT

A system and associated method for improving efficiency and data security of a relational database management system (RDBMS). Access path security is configured for respective users of the RDBMS, having either access-by-key or access-by-scan value. The access-by-key access path security requires an end user to specify a search key in a query as configured for the end user to service the query. Only few users with administrative capacity are configured with the access-by-scan access path security, which permits servicing queries in conventional ways without screening queries by scanning database. The RDBMS calculates the most efficient access path for the query received from the end user, and retrieves data requested by the query only when the calculated access path is permitted by the access path security for the end user.

20 Claims, 5 Drawing Sheets

SERVICING QUERY WITH ACCESS PATH SECURITY IN RELATIONAL DATABASE MANAGEMENT SYSTEM

BACKGROUND OF THE INVENTION

The present invention discloses a system and associated method for servicing a query with access path security in a relational database management system (RDBMS). A conventional RDBMS grants or denies access of a user to data stored in a database of the RDBMS without restricting how to retrieve the data. Consequently, in a conventional RDBMS, performance of the RDBMS may be degraded because of inefficient retrievals of data from the database.

BRIEF SUMMARY

According to one embodiment of the present invention, a method for servicing a query with access path security in a relational database management system (RDBMS) comprises: receiving the query from a user of the relational database management system (RDBMS), the RDBMS operating in a computer system, the RDBMS comprising a query processing module and a database, said database comprising at least one table, a table of said at least one table comprising at least one record, a record of said at least one record comprising at least one field, each field of said at least one field having a respective field name and being associated with a respective field value, wherein the query requests data from the database, wherein the user is configured with access path security that is selected from the group consisting of access-by-key and access-by-scan, wherein said access-by-key represents a direct access to the data requested in the query by using respective field name and associated field value of said at least one field, and wherein said access-by-scan represents a lookup of the data requested in the query by scanning said at least one table pursuant to conditions specified in the query; calculating, by a processor of the computer system, an access path for the query in dependence on no search key or at least one search key specified in the query such that the calculated access path for the query specifies the most efficient way to access the database to retrieve the data requested by the query; determining that the access path security configured for the user authorizes the user to use the calculated access path for the query; retrieving the data requested by the query by using the calculated access path for the query; and returning a result of the query to the user, wherein the result comprises the retrieved data from said retrieving.

According to one embodiment of the present invention, a computer program product comprises a computer readable memory unit that embodies a computer readable program code. The computer readable program code contains instructions that, when executed by a processor of a computer system, implement servicing a query with access path security in a relational database management system (RDBMS).

According to one embodiment of the present invention, a computer system comprises a processor and a computer readable memory unit coupled to the processor, wherein the computer readable memory unit containing instructions that, when executed by the processor, implement servicing a query with access path security in a relational database management system (RDBMS).

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing servicing a query with access path security in a relational database management system (RDBMS).

DETAILED DESCRIPTION

Figure 1:
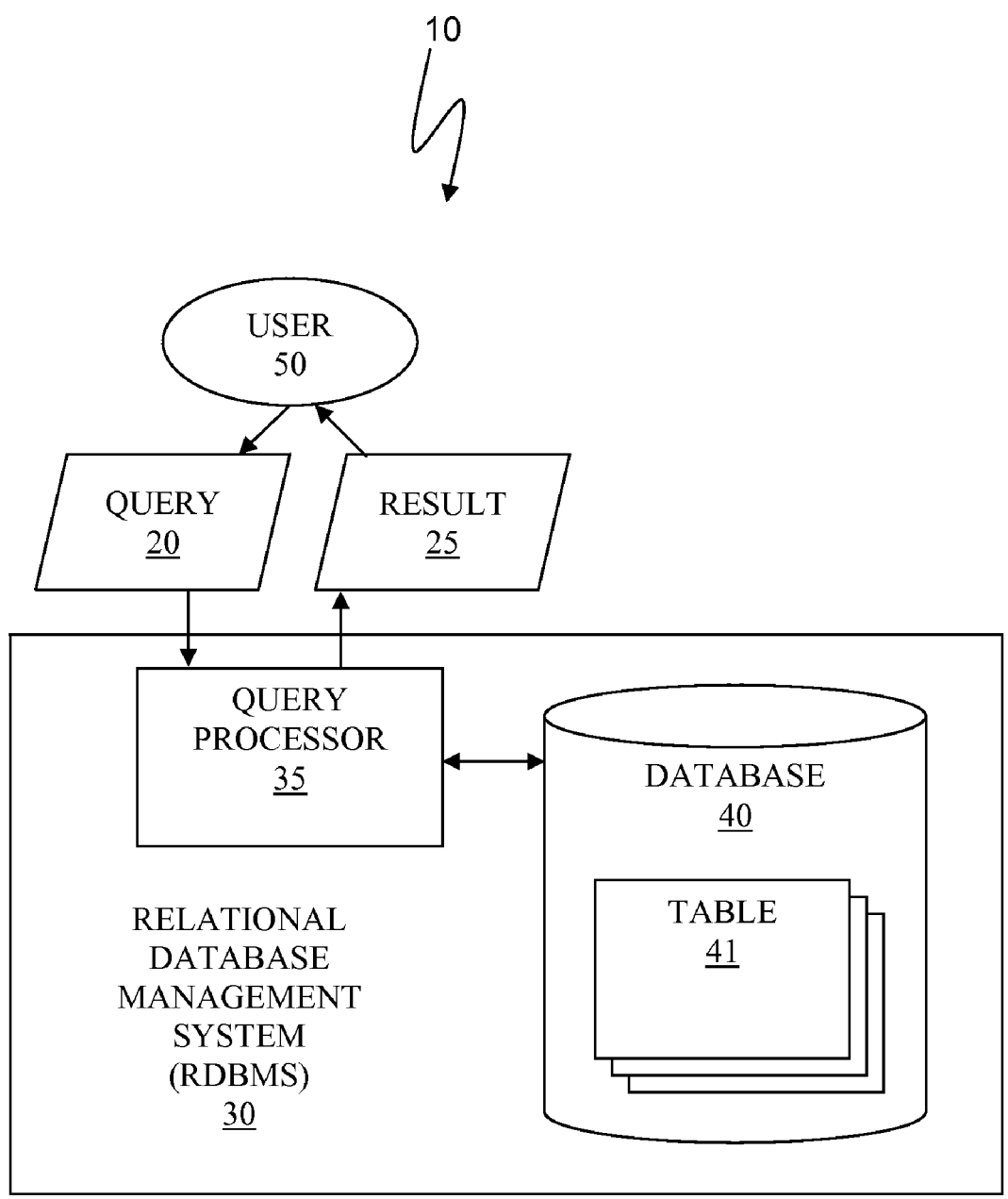
FIG. 1 illustrates the system for servicing a query with access path security in a relational database management system (RDBMS), in accordance with embodiments of the present invention.

FIG. 1 illustrates the system 10 for servicing a query 20 with access path security in a relational database management system (RDBMS) 30, in accordance with embodiments of the present invention.

The relational database management system (RDBMS) 30 comprises a query processor 35 and a database 40. The relational database management system (RDBMS) 30 is a database management system (DBMS) that is based on the relational model. An example of the RDBMS 30 may be, inter alia, IBM® DB2®, etc. (IBM and DB2 are registered trademarks of the International Business Machines Corporation in the United States and/or in other countries.) In this specification, the term "data" is used to indicate a key, a record, a table, and/or a combination thereof in the database 40.

The query processor 35 receives the query 20 from a user 50 of the RDBMS 30 and processes the query 20. The query 20 comprises conditions to retrieve data stored the database 40. An administrator of the RDBMS 30 configures access grant and access path security for the user 50 by submitting a configuration query prior to the query 20 is submitted to the RDBMS 30. See descriptions of FIGS. 3A and 3B, infra, for examples of the query 20. The query processor 35 interprets queries and performs a RDBMS operation specified such queries such as, inter alia, configuring the user 50 with the access grant and the access path security, searching the database 40 for the data that satisfies the conditions in the query 20, etc.

To retrieve the data comprising a result 25 from the database 40, the query processor 35 examines access grant and access path security of the user 50 who submitted the query 20. The access grant of the user 50 indicates whether or not the user 50 can access the database 40. If the access is granted or if the user 50 has an access grant, the user 50 can access the database.

In this specification, the term "access path security" is defined as a type of access grant for the user that determines how the user accesses the data to service the query. Wherein the access path security of the user 50 is limited to access by a particular key, even if the user 50 has access to the database, a query must specify key name and associated value to access the database and retrieve the data. In this specification, because the term "access path" indicates an actual path to access the database for a user and the term "access path security" indicates such features, the terms "access path" and "access path security" are used interchangeably when the context needs not distinguish the feature from the actual path.

In one embodiment of the present invention, access path security may further specify a number and type of index that is available for the user 50. In the same embodiment, the RDBMS 30 may have multiple indexes comprising, inter alia, a primary index and a secondary index for fast lookup of the database 40. Each user of the RDBM 30 has a respective access path as to at least one available index that each user can use in accessing the database 40. The access path security of a first user may be configured to access data via the primary index, but not the secondary index. The access path security of a second user may be configured to access data via both the primary and the secondary index.

The user 50 may access the data with a key and an associated value wherein the access path security is configured as access-by-key or access-by-scan. The user 50 may scan the database 40 to search the data wherein the access path security is configured as access-by-scan. The query processor 35 searches the data pursuant to the access path security of the user 50. The query processor 35 retrieves the data wherein the data is found in the database 40. The query processor 35 returns the result 25 comprising the retrieved data to the user 50. See descriptions of FIGS. 3A and 3B, infra, for detailed operations of the query processor 35.

Access path security enables the RDBMS 30 to screen ill-formed queries that are not specific enough to perform efficient search of the database 40 as configured in the access path security. With access path security, the RDBMS 30 services only well-formed queries that specify a same index key as configured in the access path security for the user 50. Accordingly, overall performance of the RDBMS 30 is improved. Also, access path security enables the RDBMS 30 to block the user 50 from accessing the database without providing a key name and an associated value. With access path security, the user 50 is required to provide the key name and the associated value that are required by the access path security configuration to access records in the database. Consequently, by enforcing specific path to access the database 40 with access path security, data security of the RDBMS 30 is improved. Only a limited number of database administrators (DBAs) are configured with access-by-scan access path security to scan tables in the database without providing specific index key name and associated values.

The database 40 comprises at least one table. The database 40 is a relational database that organizes data based on common attributes of the data. In this specification, the terms "field," "attribute," "key," and "column" are interchangeably used to indicate an individual attribute of the data. Also the terms "record" and "row" are used interchangeably to indicate a group of attributes. A record is identified by a primary key in the record. The term "table" is used to indicate a group of records. A table 41 of the at least one table comprises at least one record. See descriptions of FIGS. 2A and 2B, infra, as to how the table 41 is organized.

In another embodiment of the present invention, a database administrator (DBA) of the RDBMS 30 configures a respective access path security for each user of the RDBMS 30 to make queries more efficient and to improve security of the database 40. Efficiency of queries may be measured by, inter alia, estimating processing time consumed by a central processing unit (CPU) to get a result of a query, etc., as measured by the RDBMS 30. If the access path security for the user 50 is access-by-key, the user 50 must access the data requested in the query 20 with at least one key in the database 40. The user 50 cannot scan tables in the database 40 to access the data. With the access-by-key access path security, queries are required to have keys configured in the access path security to be processed. Consequently, query processing with access-by-key access path security is more efficient than query processing in conventional access grants that does not restrict users from scanning tables in the database to access data requested in queries submitted by any user. A selection of keys and a number of keys to be used for the access path security are also configured by the DBA. The query processor 35 processes a first query submitted to the RDBMS 30 from the first user to retrieve a first data only when the first query specifies a set of keys and associated values for the access path security of the first user as configured by the DBA. The access-by-key access path security may be configured to comprise a primary key of a record, or an index as defined by the RDBMS 30. With the access-by-key access path security, the RDBMS 30 runs more efficiently than conventional RDBMS by enforcing queries to have the set of keys and the associated values pursuant to the configured access path security and by discarding poorly written queries. See descriptions of FIGS. 2A and 2B, infra, for details of the primary key and the index of the table 41.

In the same embodiment of the present invention, negative access path security and access-by-scan access path security provide conventional query processing functionalities that grants or denies access to data without restricting how to access the data. The access-by-scan access path security is configured only for a limited number of users with a higher clearance level, while the access path security of most end users is configured as access-by-key. Because scanning tables in the database 40 consumes significant processing resources and memory spaces and locks up the database 40 while scanning the database 40, limiting authorities to scan the database 40 improves overall performance and data security of the RDBMS 30.

Figure 2A:
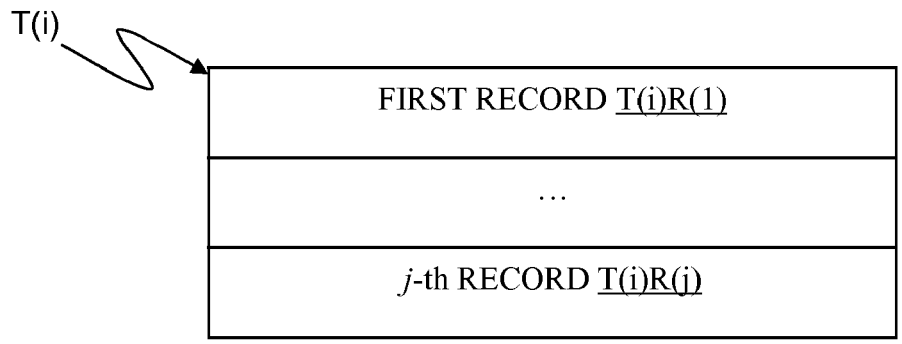
FIGS. 2A and 2B illustrate how a table in the database of FIG. 1 is organized.
Figure 2B:
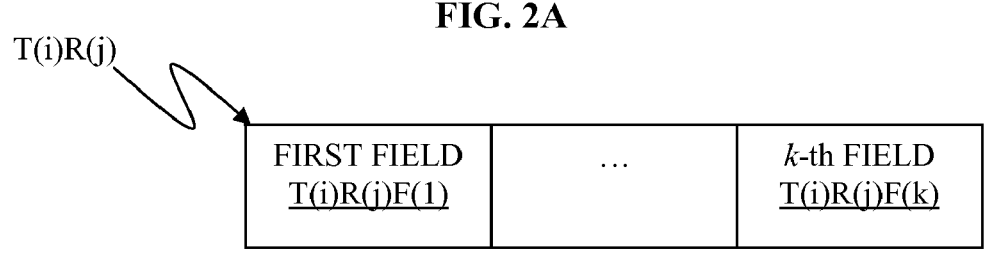

FIGS. 2A and 2B illustrate how a table in the database 40 of FIG. 1, supra, is organized, in accordance with the embodiments of the present invention.

The database 40 organizes data in multiple tables according to a respective type of information stored in each table. Tables are identified by a respective table name. Each table comprises records as represented as rows in FIG. 2A. FIG. 2A illustrates an i-th table T(i) of the database 40 of FIG. 1, supra, in accordance with embodiments of the present invention. The i-th table T(i) comprises a j number of records, wherein a record T(i)R(1) represents the first record of the i-th table T(i), and wherein a record T(i)R(j) represents the j-th record of the i-th table T(i), respectively.

All records in a table comprise a same set of fields. Records are identified, within the table, by a primary key that comprises at least one field in the records. FIG. 2B illustrates j-th record of i-th table T(i)R(j) of FIG. 2A, supra, in accordance with embodiments of the present invention. The j-th record of i-th table T(i)R(j) comprises a k number of fields, wherein a field T(i)R(j)F(1) represents the first field of the record T(i)R (j), and wherein a field T(i)R(j)F(k) represents the k-th field of the record T(i)R(j), respectively. In this specification, i, j, and k are positive integers.

Figure 2C:
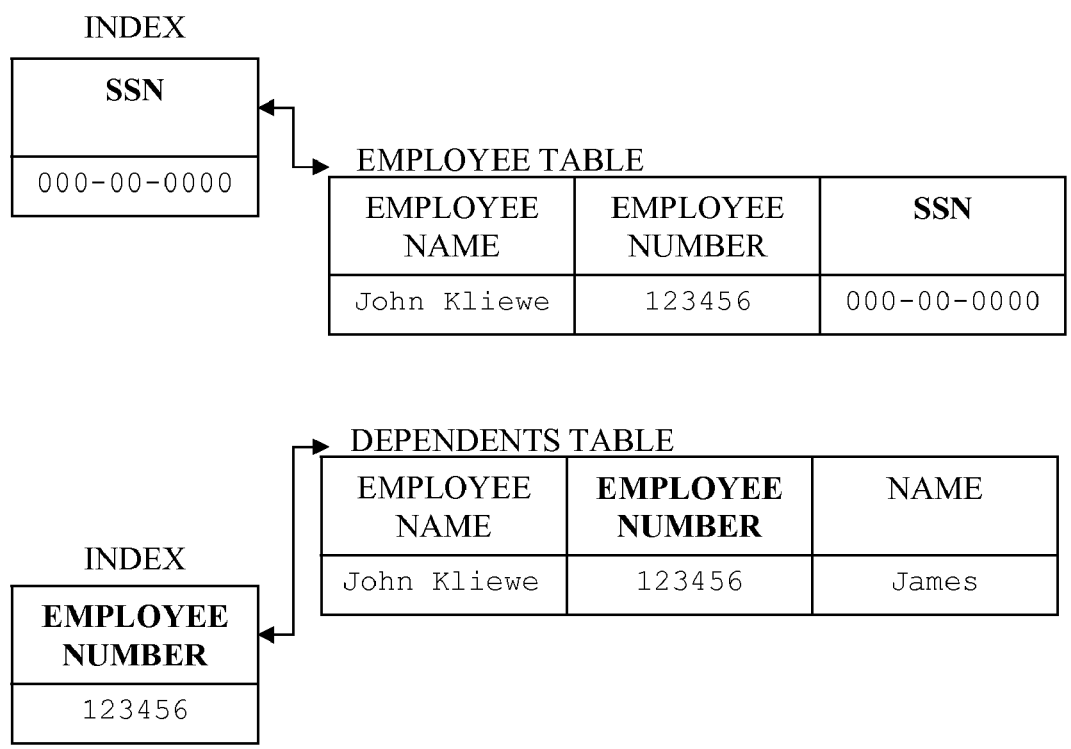
FIG. 2C illustrates an embodiment of tables in the database of FIG. 1 for queries processed in the flow charts of FIGS. 3A and 3B, in accordance with the embodiments of the present invention.
Figure 3A:
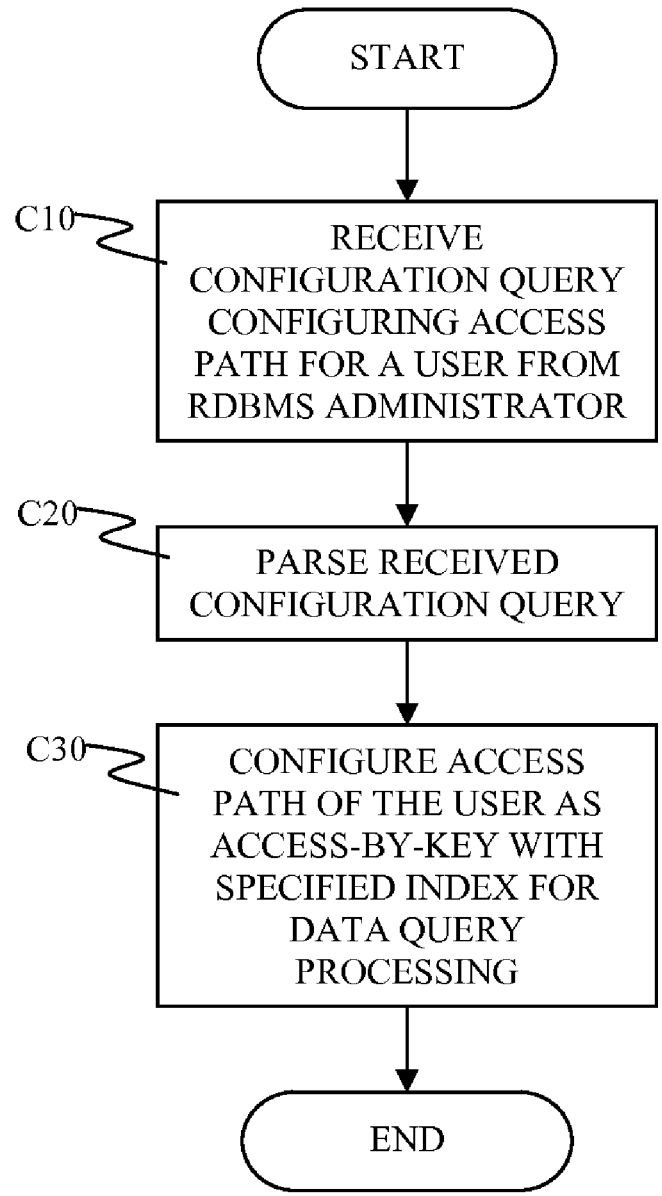
FIG. 3A is a flowchart depicting a method for configuring access path of a user to service subsequent data queries submitted by the user with access path security in a relational database management system (RDBMS), in accordance with the embodiments of the present invention.
Figure 3B:
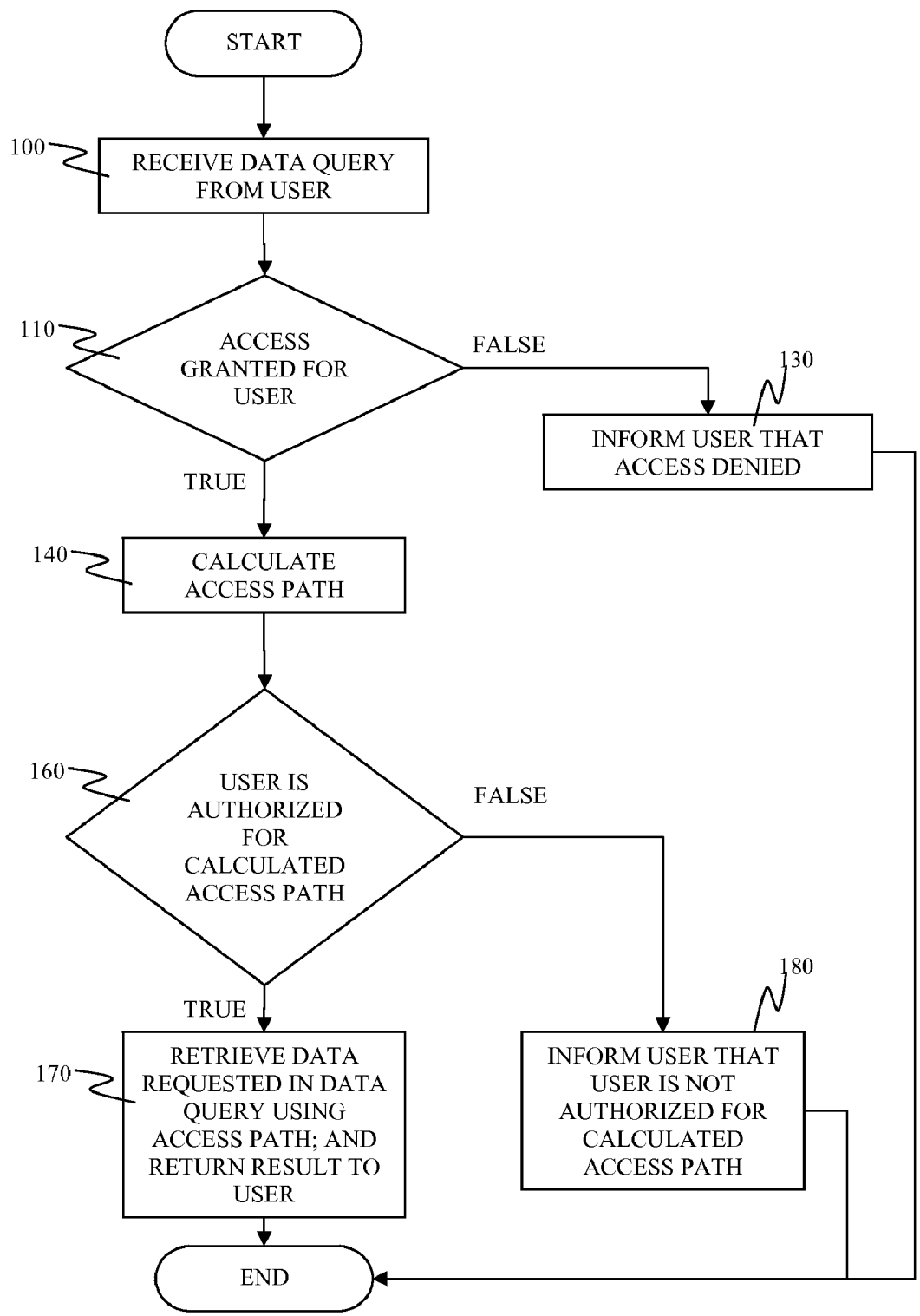
FIG. 3B is a flowchart depicting the method for servicing a data query with access path security in a relational database management system (RDBMS), in accordance with the embodiments of the present invention.

FIG. 2C illustrates an embodiment of tables in the database 40 for QUERY 1 in FIG. 3A, QUERY 2 and QUERY 3 in FIG. 3B, infra, in accordance with the embodiments of the present invention.

A table EMPLOYEE comprises fields of employee name, employee number, and SSN. A table DEPENDENTS comprises fields of employee name, employee number, and name. The table EMPLOYEE is indexed by the field SSN. The table DEPENDENTS is indexed by the field employee number. The indices for respective tables are stored in a memory of a computer system that accesses the database to facilitate efficient searches for the respective tables of the database.

FIG. 3A is a flowchart depicting a method for configuring access path of a user to service subsequent data queries submitted by the user with access path security in a relational database management system (RDBMS), in accordance with the embodiments of the present invention.

Prior to service queries, a database administrator (DBA) of the RDBMS configures access grant and access path security of a user of the RDBMS. The access grant of the user indicates that the user can access a database of the RDBMS, which is configured as either granted or denied. Access path security is defined supra as a type of access grant for the user that determines how the user accesses the data to service the query, which is configured as either access-by-key or access-by-scan.

The term query indicates any request for a database operation. In this specification, queries are classified as either a configuration query that configures user environment comprising access grant and access path security or a data query, or simply a query, that requests data from the database. Steps C10, C20, and C30 of FIG. 3A describes how the query processor processes the configuration query. Steps 100 to 180 of FIG. 3B, infra, describes how the query processor processes the data query, or the query.

In step C10, the query processor receives a configuration query that configures access path for a user from an administrator of the relational database management system (RDBMS).

In step C20, the query processor parses the configuration query received in step C10. The query processor identifies at least one index specified in the query.

In step C30, the query processor configures the access path of the user as access-by-key with an index of said at least one index specified in the configuration query for processing subsequent data queries submitted by the user.

In one embodiment of the present invention, a configuration query to configure access path of a user with user-id "XYZ" is as following:

[QUERY 1] "GRANT read access on table EMPLOYEE to user XYZ via index SSN"

QUERY 1 configures access path security for the user with user-id "XYZ" to use SSN field, indicating social security number, as an index for accessing EMPLOYEE table for retrieval. In this embodiment, the SSN field in the EMPLOYEE table is a primary key that is used to identify each record in the EMPLOYEE table. An index for a table is a group of at least one field in the table kept in memory spaces to achieve faster search performance in relational database management systems by searching the index prior to search the table in a database. Because the primary key uniquely identifies each record with only one field in the table, requiring the primary key to be the index in searching the EMPLOYEE table improves search performance in servicing a query against the EMPLOYEE table. QUERY 1 configures the RDBMS such that the user "XYZ" must provide the primary key SSN to access the EMPLOYEE table and such that the user "XYZ" cannot access any other records in EMPLOYEE table if the user "XYZ" does not know the primary key SSN of the record. As a result, if the RDBMS is configured with QUERY 1, a subsequent query submitted by the user "XYZ" cannot occupy the RDBMS for scanning the EMPLOYEE table without specifying the primary key SSN, which results in more efficient and more secure database operation.

FIG. 3B is a flowchart depicting the method for servicing a data query with access path security in a relational database management system (RDBMS), in accordance with the embodiments of the present invention.

Prior to perform step 100 of FIG. 3B, a database administrator (DBA) of the RDBMS configures access grant and access path security of the user pursuant to the method described in FIG. 3A, supra.

In step 100, the query processor receives the data query (hereinafter the query) from the user. The query requests the RDBMS to retrieve data meeting certain conditions from the database. Conditions specified in the query may be, inter alia, a table to search, a field to compare, a search key value of the field to match with the field of records in the table, and a combination thereof. See QUERY 2 descriptions of FIG. 3B, infra, for examples.

In step 110, the query processor determines whether the user has been granted access to the database to service the query. If the query processor determines that the user has been granted access to the database to service the query, then the query processor proceeds with step 140 to calculate the access path that is necessary to service the query. In step 110, if the query processor determines that the user has not been granted access to the database to service the query, then the query processor proceeds with step 130 to terminate processing the query. In step 130, the query processor returns an error message notifying the user that the user cannot access the database to service the query and terminates processing the query without generating a result of the query.

In step 140, the query processor calculates an access path for the query to retrieve data requested by the query in a most efficient way in terms of processing overhead and storage access time, etc. The search key may be, inter alia, a primary key of a table specified in the query, an index of the same table, etc.

In step 160, the query processor determines whether the user is authorized to use the calculated access path for the query resulting from step 140. If the query processor determines, in step 160, that the user is authorized to use the calculated access path for the query, then the query processor proceeds with step 170 to service the query. The query processor determines, in step 160, that the user is authorized to use the calculated access path for the query.

In step 170, because the user is authorized to use the calculated access path for the query, the query processor retrieves the data according to the calculated access path for the query and subsequently generates and returns the result comprising the data requested by the query, in response to the query.

If the query processor determines, in step 160, that the user is not authorized to use the calculated access path for the query, the query processor proceeds to step 180 to terminate processing the query. The query processor determines, in step 160, that the user is not authorized to use the calculated access path for the query wherein the user has access-by-key access path security and wherein the calculated access path for the query is the access-by-scan. In step 180, the query process returns an error message notifying the user that the user is not authorized to access the database to service the query in a way as configured by the database administrator and terminates without generating the result in response to the query.

In one embodiment of the present invention, a query requesting data from the database with a key is as following:

[QUERY2] "SELECT name from DEPENDENTS where employee name='John Kliewe'"

QUERY 2 requests "name" field values from DEPENDENTS table by using a specific value 'John Kliewe' for "employee" field. QUERY 2 indicates that DEPENDENTS table has at least two fields "name" and "employee," and the "employee" field is used as a search key to retrieve names of dependents of an employee from the relational database. Because a logical path to individual data is not provided in a relational database, a query must specify a table to be searched for to service the query.

In the same embodiment, wherein EMPLOYEE table has no index on "employee name" field, but has index on "employee number" field, and access path security of a user who submitted QUERY 2 is configured to access-by-key that searches only index key, the RDBMS does not scan the EMPLOYEE table to service QUERY 2 specifying a value for "employee name" field and rejects QUERY 2.

In the same embodiment, the RDBMS services following QUERY 3 that specifies a value for "employee number" field by looking up the "employee number" index and subsequently retrieving data requested in QUERY 3.

[QUERY 3] "SELECT name from DEPENDENTS where employee number=123456"

Figure 4:
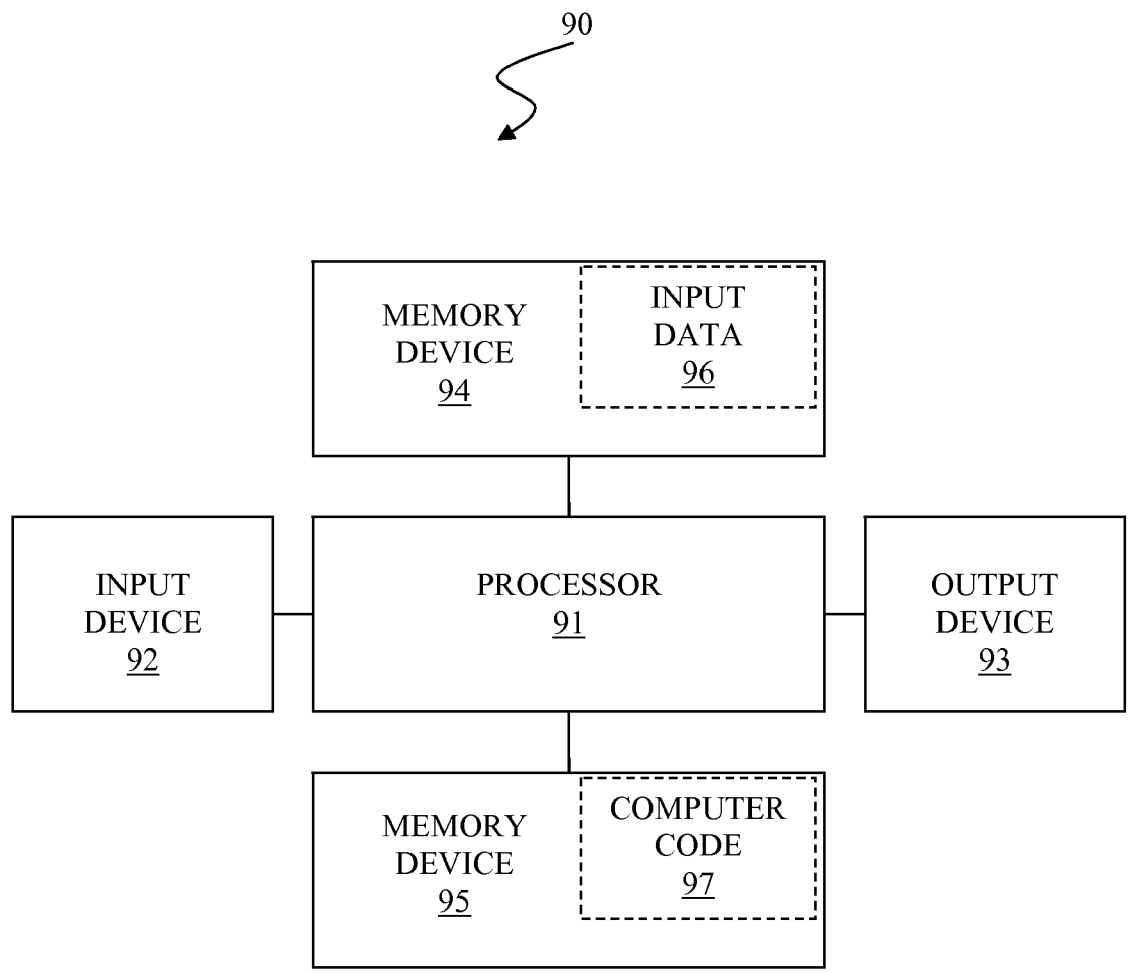
FIG. 4 illustrates a computer system used for servicing a query with access path security in a relational database management system (RDBMS), in accordance with the embodiments of the present invention.

FIG. 4 illustrates a computer system 90 used for servicing a query with access path security in a relational database management system (RDBMS), in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for servicing a query with access path security in the RDBMS according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for servicing a query with access path security in the RDBMS.

In another embodiment, the invention provides a business method that performs the process steps of the invention on a subscription, advertising and/or fee basis. That is, a service provider, such as a Solution Integrator, can offer to create, maintain, support, etc. a process for determining web analytics information of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with an instruction execution system, apparatus, or device.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for servicing a data query with access path security in a relational database management system (RDBMS), said method comprising:

configuring access path security corresponding to a user originating the data query requesting data stored in the RDBMS pursuant to a configuration query associated with the user received from an administrator of the RDBMS, wherein the RDBMS operates in a computer system, the RDBMS comprising a query processing module and a database, said database comprising at least one table, a table of said at least one table comprising at least one record, a record of said at least one record comprising at least one field, a field of said at least one field having a name of the field and a value stored in the field, wherein the table comprises an index field that uniquely identifies each record of the table, wherein the database searches the record faster when using the index field than when a non-index field of the table in searching for the record within the table, wherein the data query requests a value stored in a result field by specifying the result field and a result table of said at least one table, wherein the result field is within a result record of the result table, wherein the configuration query specifies a usable index field associated with the result table enabling the user to access the result table by use of the usable index field, wherein the access path security is selected from a group consisting of access-by-key and access-by-scan, wherein the access-by-key access path security mandates the user to provide a search key in the data query in searching the result table, wherein the search key comprises a name and a value, the name of the search key being identical to the usable index field specified in the configuration query associated with the user such that the access-by-key access path security enables users to search the result table only when the users specify the usable index field in the data query, and wherein the access-by-scan access path security enables the user to scan all fields in any record of the result table pursuant to a search condition of the data query;

receiving the data query from the user of the RDBMS;

calculating, by a processor of the computer system, an access path for the data query based on search specification of the data query, wherein the search specification is selected from a group consisting of the search key and the search condition;

determining that the access path security from said configuring authorizes the user to use the calculated access path for servicing the data query;

retrieving the data requested by the data query responsive to searching the database for the value of the result field only via the calculated access path for the data query; and returning the retrieved data from said retrieving to the user.

2. The method of claim 1, said configuring comprising:

receiving the configuration query from the administrator of the RDBMS, wherein the configuration query specifies the user, the result table, and the usable index field;

determining that the user is an end user of the RDBMS; and configuring the access path security of the user as access-by-key by the usable index field specified in the configuration query such that the RDBMS is configured to permit the end user to access the result table only when the end user provides the name of the search key that is identical to a name of the usable index field.

3. The method of claim 1, said configuring comprising:

receiving the configuration query from the administrator of the RDBMS, wherein the configuration query specifies the user and the result table;

determining that the user is the administrator of the RDBMS; and configuring the access path security of the user as access-by-scan such that the RDBMS is configured to permit the administrator to access all fields of any record in the result table without using any index field.

4. The method of claim 1, said calculating comprising:

discovering that the search specification of the data query is the search key, wherein the name of the search key is identical to a name of the usable index field of the result table, which enables the search key directly locate the result record within the result table by comparing the value of the search key and a value of the usable index field; and calculating the access path for the data query as access-by-key associated with the search key such that the query processing module directly accesses the data requested in the data query by using the name of the search key and the value of the search key.

5. The method of claim 1, said calculating comprising:

discovering that the search specification of the data query is the search condition indicating that the data query requests the data without using any index field associated with the result table, wherein the search condition comprises a selected field of the result record, wherein the selected field is distinctive from the usable index field; and calculating the access path for the data query as access-by-scan such that the query processing module searches for the data requested in the data query by scanning the result table by comparing respective values of the selected field in all records in the result table with a value of the selected field as specified in the search condition.

6. A computer program product comprising:

a computer readable storage device storing a computer readable program code therein, said computer readable program code containing instructions that perform servicing a data query with access path security in a relational database management system (RDBMS), said servicing comprising:

configuring access path security corresponding to a user originating the data query requesting data stored in the RDBMS pursuant to a configuration query associated with the user received from an administrator of the RDBMS, wherein the RDBMS operates in a computer system, the RDBMS comprising a query processing module and a database, said database comprising at least one table, a table of said at least one table comprising at least one record, a record of said at least one record comprising at least one field, a field of said at least one field having a name of the field and a value stored in the field, wherein the table comprises an index field that uniquely identifies each record of the table, wherein the database searches the record faster when using the index field than when a non-index field of the table in searching for the record within the table, wherein the data query requests a value stored in a result field by specifying the result field and a result table of said at least one table, wherein the result field is within a result record of the result table, wherein the configuration query specifies a usable index field associated with the result table enabling the user to access the result table by use of the usable index field, wherein the access path security is selected from a group consisting of access-by- key and access-by-scan, wherein the access-by-key access path security mandates the user to provide a search key in the data query in searching the result table, wherein the search key comprises a name and a value, the name of the search key being identical to the usable index field specified in the configuration query associated with the user such that the access-by-key access path security enables users to search the result table only when the users specify the usable index field in the data query, and wherein the access-by-scan access path security enables the user to scan all fields in any record of the result table pursuant to a search condition of the data query;

receiving the data query from the user of the RDBMS;

calculating, by a processor of the computer system, an access path for the data query based on search specification of the data query, wherein the search specification is selected from a group consisting of the search key and the search condition;

determining that the access path security from said configuring authorizes the user to use the calculated access path for servicing the data query;

retrieving the data requested by the data query responsive to searching the database for the value of the result field only via the calculated access path for the data query; and returning the retrieved data from said retrieving to the user.

7. The computer program product of claim 6, said configuring comprising:

receiving the configuration query from the administrator of the RDBMS, wherein the configuration query specifies the user, the result table, and the usable index field;

determining that the user is an end user of the RDBMS; and configuring the access path security of the user as access-by-key by the usable index field specified in the configuration query such that the RDBMS is configured to permit the end user to access the result table only when the end user provides the name of the search key that is identical to a name of the usable index field.

8. The computer program product of claim 6, said configuring comprising:

receiving the configuration query from the administrator of the RDBMS, wherein the configuration query specifies the user and the result table;

determining that the user is the administrator of the RDBMS; and configuring the access path security of the user as access-by-scan such that the RDBMS is configured to permit the administrator to access all fields of any record in the result table without using any index field.

9. The computer program product of claim 6, said calculating comprising:

discovering that the search specification of the data query is the search key, wherein the name of the search key is identical to a name of the usable index field of the result table, which enables the search key directly locate the result record within the result table by comparing the value of the search key and a value of the usable index field; and calculating the access path for the data query as access-by-key associated with the search key such that the query processing module directly accesses the data requested in the data query by using the name of the search key and the value of the search key.

10. The computer program product of claim 6, said calculating comprising:

discovering that the search specification of the data query is the search condition indicating that the data query requests the data without using any index field associated with the result table, wherein the search condition comprises a selected field of the result record, wherein the selected field is distinctive from the usable index field; and calculating the access path for the data query as access-by-scan such that the query processing module searches for the data requested in the data query by scanning the result table by comparing respective values of the selected field in all records in the result table with a value of the selected field as specified in the search condition.

11. A computer system comprising:

a processor and a computer readable storage medium coupled to the processor, said computer readable storage medium containing instructions that when executed by the processor implement servicing a data query with access path security in a relational database management system (RDBMS), said servicing comprising:

configuring access path security corresponding to a user originating the data query requesting data stored in the RDBMS pursuant to a configuration query associated with the user received from an administrator of the RDBMS, wherein the RDBMS operates in a computer system, the RDBMS comprising a query processing module and a database, said database comprising at least one table, a table of said at least one table comprising at least one record, a record of said at least one record comprising at least one field, a field of said at least one field having a name of the field and a value stored in the field, wherein the table comprises an index field that uniquely identifies each record of the table, wherein the database searches the record faster when using the index field than when a non-index field of the table in searching for the record within the table, wherein the data query requests a value stored in a result field by specifying the result field and a result table of said at least one table, wherein the result field is within a result record of the result table, wherein the configuration query specifies a usable index field associated with the result table enabling the user to access the result table by use of the usable index field, wherein the access path security is selected from a group consisting of access-by- key and access-by-scan, wherein the access-by-key access path security mandates the user to provide a search key in the data query in searching the result table, wherein the search key comprises a name and a value, the name of the search key being identical to the usable index field specified in the configuration query associated with the user such that the access-by-key access path security enables users to search the result table only when the users specify the usable index field in the data query, and wherein the access-by-scan access path security enables the user to scan all fields in any record of the result table pursuant to a search condition of the data query;

receiving the data query from the user of the RDBMS;

calculating, by a processor of the computer system, an access path for the data query based on search specification of the data query, wherein the search specification is selected from a group consisting of the search key and the search condition;

determining that the access path security from said configuring authorizes the user to use the calculated access path for servicing the data query;

retrieving the data requested by the data query responsive to searching the database for the value of the result field only via the calculated access path for the data query; and returning the retrieved data from said retrieving to the user.

12. The computer system of claim 11, said configuring comprising:

receiving the configuration query from the administrator of the RDBMS, wherein the configuration query specifies the user, the result table, and the usable index field;

determining that the user is an end user of the RDBMS; and configuring the access path security of the user as access-by-key by the usable index field specified in the configuration query such that the RDBMS is configured to permit the end user to access the result table only when the end user provides the name of the search key that is identical to a name of the usable index field.

13. The computer system of claim 11, said configuring comprising:

receiving the configuration query from the administrator of the RDBMS, wherein the configuration query specifies the user and the result table;

determining that the user is the administrator of the RDBMS; and configuring the access path security of the user as access-by-scan such that the RDBMS is configured to permit the administrator to access all fields of any record in the result table without using any index field.

14. The computer system of claim 11, said calculating comprising:
discovering that the search specification of the data query is the search key, wherein the name of the search key is identical to a name of the usable index field of the result table, which enables the search key directly locate the result record within the result table by comparing the value of the search key and a value of the usable index field; and
calculating the access path for the data query as access-by-key associated with the search key such that the query processing module directly accesses the data requested in the data query by using the name of the search key and the value of the search key.

15. The computer system of claim 11, said calculating comprising:
discovering that the search specification of the data query is the search condition indicating that the data query requests the data without using any index field associated with the result table, wherein the search condition comprises a selected field of the result record, wherein the selected field is distinctive from the usable index field; and
calculating the access path for the data query as access-by-scan such that the query processing module searches for the data requested in the data query by scanning the result table by comparing respective values of the selected field in all records in the result table with a value of the selected field as specified in the search condition.

16. A process for supporting computer infrastructure, said process comprising providing at least one support service for at least one of creating, integrating, hosting, maintaining, and deploying computer-readable code in a computing system, wherein the code in combination with the computing system is capable of performing servicing a data query with access path security in a relational database management system (RDBMS), said servicing comprising:
configuring access path security corresponding to a user originating the data query requesting data stored in the RDBMS pursuant to a configuration query associated with the user received from an administrator of the RDBMS,
wherein the RDBMS operates in a computer system, the RDBMS comprising a query processing module and a database, said database comprising at least one table, a table of said at least one table comprising at least one record, a record of said at least one record comprising at least one field, a field of said at least one field having a name of the field and a value stored in the field, wherein the table comprises an index field that uniquely identifies each record of the table, wherein the database searches the record faster when using the index field than when a non-index field of the table in searching for the record within the table,
wherein the data query requests a value stored in a result field by specifying the result field and a result table of said at least one table, wherein the result field is within a result record of the result table,
wherein the configuration query specifies a usable index field associated with the result table enabling the user to access the result table by use of the usable index field,
wherein the access path security is selected from a group consisting of access-by- key and access-by-scan,
wherein the access-by-key access path security mandates the user to provide a search key in the data query in searching the result table, wherein the search key comprises a name and a value, the name of the search key being identical to the usable index field specified in the configuration query associated with the user such that the access-by-key access path security enables users to search the result table only when the users specify the usable index field in the data query, and
wherein the access-by-scan access path security enables the user to scan all fields in any record of the result table pursuant to a search condition of the data query;
receiving the data query from the user of the RDBMS;
calculating, by a processor of the computer system, an access path for the data query based on search specification of the data query, wherein the search specification is selected from a group consisting of the search key and the search condition;
determining that the access path security from said configuring authorizes the user to use the calculated access path for servicing the data query;
retrieving the data requested by the data query responsive to searching the database for the value of the result field only via the calculated access path for the data query; and
returning the retrieved data from said retrieving to the user.

17. The process of claim 16, said configuring comprising:
receiving the configuration query from the administrator of the RDBMS, wherein the configuration query specifies the user, the result table, and the usable index field;
determining that the user is an end user of the RDBMS; and
configuring the access path security of the user as access-by-key by the usable index field specified in the configuration query such that the RDBMS is configured to permit the end user to access the result table only when the end user provides the name of the search key that is identical to a name of the usable index field.

18. The process of claim 16, said configuring comprising:
receiving the configuration query from the administrator of the RDBMS, wherein the configuration query specifies the user and the result table;
determining that the user is the administrator of the RDBMS; and
configuring the access path security of the user as access-by-scan such that the RDBMS is configured to permit the administrator to access all fields of any record in the result table without using any index field.

19. The process of claim 16, said calculating comprising:
discovering that the search specification of the data query is the search key, wherein the name of the search key is identical to a name of the usable index field of the result table, which enables the search key directly locate the result record within the result table by comparing the value of the search key and a value of the usable index field; and
calculating the access path for the data query as access-by-key associated with the search key such that the query processing module directly accesses the data requested in the data query by using the name of the search key and the value of the search key.

20. The process of claim 16, said calculating comprising:
discovering that the search specification of the data query is the search condition indicating that the data query requests the data without using any index field associated with the result table, wherein the search condition comprises a selected field of the result record, wherein the selected field is distinctive from the usable index field; and calculating the access path for the data query as access-by-scan such that the query processing module searches for the data requested in the data query by scanning the result table by comparing respective values of the selected field in all records in the result table with a value of the selected field as specified in the search condition.

* * * * *